June 9, 1925.
G. C. THOMAS, JR
ADAPTER FOR CONNECTING DEVICES
Filed May 4, 1921
1,541,537
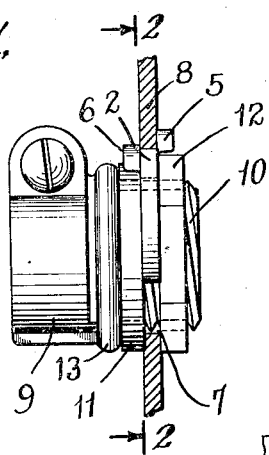
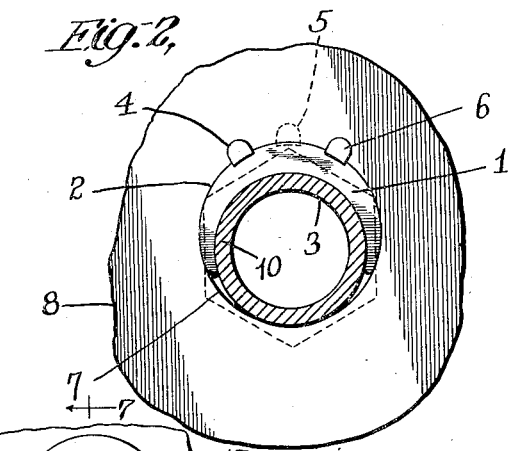
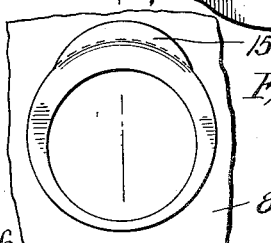
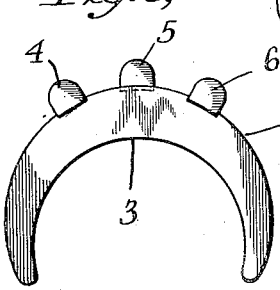
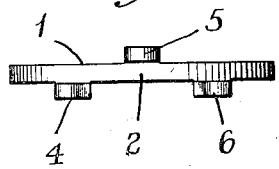
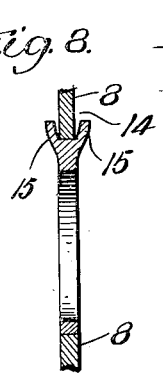
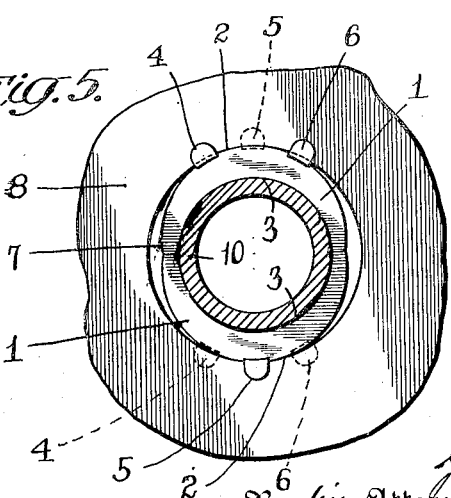
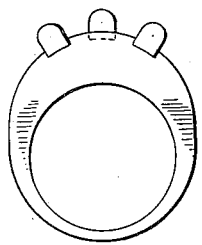
Inventor
George C. Thomas Jr.
By his Attorney Patented June 9, 1925.

1,541,537

UNITED STATES PATENT OFFICE.

GEORGE C. THOMAS, JR., OF ELIZABETH, NEW JERSEY, ASSIGNOR TO THE THOMAS & BETTS CO., OF ELIZABETH, NEW JERSEY, A CORPORATION OF NEW JERSEY.

ADAPTER FOR CONNECTING DEVICES.

Application filed May 4, 1921. Serial No. 466,782.

*To all whom it may concern:*

Be it known that I, GEORGE C. THOMAS, Jr., a citizen of the United States, residing at Elizabeth, in the county of Union and State of New Jersey, have invented certain new and useful Improvements in Adapters for Connecting Devices, of which the following is a specification.

My invention relates to adapters for connecting devices, by which I mean appliances which may be used in connection with openings in outlet boxes, or the like, to enable an electrical connector, conduit or cable, or the like, of a smaller size than the opening, to be mounted in or through the opening.

It is very often desired to mount a connector, or a conduit, or a cable, or the like, through a substantially larger opening in the wall of an outlet box or other appliance, and various means have been employed heretofore to more satisfactorily conform the size of the opening to the size of the element intended to be placed therethrough. Such means have usually taken the form of an annular shank formed on a bushing adapted to be secured upon the connector, to fasten it to the wall, with the shank extending into the opening between the wall and the neck of the connector. Bushings and nuts having such shanks have been comparatively costly to manufacture and only permit of the placing of the connector or conduit centrally through the opening. The aim of my invention is to provide a simple device which is separate from the connector or from the means by which the connector is fastened to the opening, and a device which may be readily and easily inserted in an opening and will satisfactorily adapt the opening to the size of the particular connector, or conduit, or cable. A further object of my invention is to provide means whereby the adapter will be securely locked against removal or displacement when the connector or conduit is in position in the opening. Another object of my invention is to provide an adapter for electrical connectors, conduits, cables and the like, which permits of the positioning of the connector, or the like, toward any side of the opening as desired, and a device which may be manufactured at a low cost and separately from the connectors and from the washers, nuts, or similar elements, used in locking the connectors in position on the walls.

I accomplish my purpose very simply and efficiently by providing a substantially crescent-shaped piece of material having suitable rigidity, and providing at a plurality of points on its exterior periphery outwardly extending ears, one or more of which ears are offset axially in one direction to a certain extent, and others of which are offset axially in the opposite direction to a certain extent. This device is adapted to be placed inside of an opening in an outlet box or the like, with its outer periphery contacting the periphery of the opening, and with two or more of the ears overlapping opposite sides of the wall about the opening, and with its inner periphery contacting the outer periphery of a connector, or conduit, or cable, or the like, seated through the opening. By being disposed in the opening between the periphery of the opening and the connector, or other member therein, an opening is provided conforming more nearly to the size of the inserted element, and at the same time the adapter is held by the ears, which engage and overlap opposite sides of the wall, from axial displacement from the opening when the connector or other element, is positioned therein. By positioning the adapter in a predetermined position in respect to the circumference of the opening, the connector, or other element, may be positioned toward any side of the opening as desired. The adapter is so constructed that the usual means for locking the connector or other element, to the wall are not interfered with. The locking means, moreover, aid in retaining the adapter in its desired position in the wall.

In order that my invention may be more clearly understood, attention is hereby directed to the accompanying drawings forming part of this application and illustrating one possible embodiment of my invention.

In the drawings, Fig. 1 illustrates in side elevation one form of my invention mounted in an opening in a wall, in combination with an electrical connecting device; Fig. 2 is a front elevation of the device illustrated and mounted as in Fig. 1, the view being taken on line 2—2 of Fig. 1; Fig. 8 is a plan view of my improved adapter; Fig. 4 is a top view of the adapter shown in Fig. 3; Fig. 5 illustrates the combination of two of my adapters seated in a wall opening in combination with a connector positioned therethrough, the connector being shown in section; Fig. 6 is a front view of a modified form of adapter embodying my invention; Fig. 7 is a front view of another form of adapter embodying my invention mounted in an opening in the wall; and Fig. 8 is a sectional view of the same, and is taken on the line 8—8 of Fig. 7. Similar reference characters refer to similar parts throughout the several views of the drawings.

Referring to the drawings, the adapter 1, as shown, is substantially crescent-shaped and may be made of any substance which is sufficiently rigid, such as a suitable metal or hard rubber or the like. This crescent-shaped piece is of moderate thickness and has an outer periphery 2 and an inner periphery 3. On the outer periphery are formed a plurality of ears, three being illustrated at 4, 5 and 6, respectively. These ears may be formed integrally from a portion of the material used for the crescent-shaped body portion or they may be otherwise suitably attached in position thereon. These ears are rigid and extend outwardly from the outer periphery 2 of the body portion and two of the ears, 4 and 6, are offset axially in one direction to a certain extent, and the other ear, 5, intermediate the ears 4 and 6, is offset axially in the opposite direction to a certain extent, so that sufficient space is left axially between both the ears 4 and 6 and the ear 5 to permit of the reception of a wall between them, with ears 4 and 6 on one side of the wall and ear 5 on the opposite side of the wall.

When, for example, it is desired to use this adapter with an electrical connecting device such as is illustrated in Fig. 1, the adapter 1, is placed in the opening 7 in the wall 8 of the outlet box or the like, with the outer periphery 2 of the adapter in contact with the periphery of the opening 7 and with the ears, such as 4 and 6, which are offset in one axial direction, overlapping and adapted to contact one side of the wall 8, and with the ears, such as 5, which are offset in the opposite axial direction, overlapping and adapted to contact the opposite side of the wall. The connector 9 is positioned in the opening with the periphery of its neck portion 10 in contact at one side with the inner periphery 3 of the adapter and at its opposite side in contact with the periphery of the aperture 7 of the wall 8. The connector may then be locked to the wall in the usual manner, as by means of washer 11, at one side of the wall, in combination with a lock nut or threaded bushing 12 adjusted on the neck 10 at the other side of the wall. The washer 11 and the lock nut 12 may bind against the adapter on opposite sides and thus aid in securing it in firm position in the opening. The ears on the adapter will prevent the device from being removed axially from the opening, since the usual or standard nut 12 and washer 11 are not wide enough to overlap the wall beyond the wider portion of the adapter. It is readily seen that by positioning the adapter in a predetermined position in the opening, the cable or connector may be positioned toward any side of the opening. When the opening is exceptionally large for the size of the conduit, or other element desired to be placed therein, two adapters, as above described, may be used. In this case, as shown in Fig. 5, the two adapters 1, are placed in the opening 7 diametrically opposite each other, or substantially so, with their outer peripheries 2 in contact with the periphery of opening 7 and their inner peripheries 3 in contact with the conduit, or other element 10, and their ears 4 and 6 overlapping one side of the wall 8 and ear 5 overlapping the wall 8 on the opposite side. They may abut each other at their respective ends, or not, depending upon the size of the opening, and the size of the connector or other element, mounted in the opening. In this case a nut and washer of the usual size would be smaller than the opening, and without the ears on the adapters the parts would fall out of the opening. When the enlarged hole requires either one or two adapters, ears on the adapters eliminate the necessity of providing either nuts or washers which are wide enough to overlap the wall on all sides of the opening and avoids the inconvenience and cost of being obliged to have such unusually large and special size nuts and washers on hand.

The material used for the adapter may or may not be pliable, as desired. When pliable, the adapter is capable of being conformed more or less exactly to the size of the opening or to the size of the conduit or connector, or cable, with which it is to be used. It is also within the scope of my invention to fashion the adapter of sufficiently soft material so that the inner or outer periphery may be cut away, or whittled to more accurately conform the adapter to elements and openings of different sizes.

If desired, washer 11 may be dispensed with and the shoulder 13 of the connector used as an abutment means to engage that side of the fittings.

My improved adapter may readily be produced inexpensively and expeditiously by a stamping operation, and quantities may be conveniently kept in stock or on hand without requiring much storage space.

As many changes could be made in the above construction without departing from the scope of my invention, it is intended that all matter contained in the above description or shown in the accompanying drawings shall be interpreted as illustrative and not in a limiting sense. For instance, although the adapter has been described as being substantially crescent-shaped, this element may be elliptical as shown in Fig. 6, or circular as shown in Fig. 7, with the opening in each case eccentrically located herein. It is also to be noted that the periphery of the device may be grooved as at 14 (Figs. 7 and 8) to provide two flanges 15 adapted to overlap opposite sides of the wall.

What I claim is:

1. A device of the character described consisting of a substantially rigid, flat crescent-shaped body portion and a plurality of projections extending outwardly beyond its exterior periphery, two of said projections being offset axially in opposite directions to provide a space axially therebetween.

2. A device of the character described, comprising in combination, a substantially rigid flat body portion having an aperture eccentrically located therein, said body portion being adapted to be seated within an opening in a wall, reducing the size thereof and having projections overlapping opposite sides of said wall.

3. An adapter for electrical connectors, conduits, cables or the like, comprising a flat substantially crescent-shaped element adapted to be inserted in an opening in the wall with its convex top surface in contact with the periphery of said opening and its concave inner surface adapted to contact a connector, or the like, disposed in said opening, said element having a plurality of ears extending outwardly beyond its convex top surface, one of said ears being offset axially relative to another of said ears and said two ears being adapted to overlap and contact opposite sides of the wall in which said adapter is disposed.

4. The combination with an outlet box or the like having an opening, of a reducer for said opening having an external diameter to fit within said opening and an internal aperture, the center of said internal aperture lying to one side of the center of said external diameter, said reducer having a plurality of oppositely offset portions extending outwardly beyond its external diameter and fitting against opposite sides of the box wall adjacent its opening, and a connecting device having an annular shoulder, one part of which overlaps a part of the wall of said box at its opening and a portion thereof overlapping said reducer.

This specification signed this second day of May, 1921.

GEORGE C. THOMAS, Jr.